D. T. Ward's
Improved Annular Churn.

PATENTED
JAN 21 1868

73479

D. T. Ward. Inventor.
By J. B. Abbott Attorney.

Ruth N. Abbott
Geo. J. Leslie } Witnesses.

United States Patent Office

D. T. WARD, OF CARDINGTON, OHIO.

Letters Patent No. 73,479, dated January 21, 1868.

---

IMPROVEMENT IN CHURNS.

---

The Schedule referred to in these Letters Patent and making part of the same.

---

TO ALL WHOM IT MAY CONCERN:

Be it known that I, D. T. WARD, of Cardington, in the county of Morrow, and State of Ohio, have invented new and useful Improvements in Annular Churns; and I do hereby declare that the following is a full, clear, and exact description of my invention, reference being had to the accompanying drawings, and to the letters of reference marked thereon, of which drawings—

The nature of my invention consists in the peculiar construction of an adjustable annular ring, used in connection with a peculiarly formed dasher, the said parts being so arranged that, by the rotation of the dasher, the cream is caused to move around and upon the inner surface of the churn, and, striking on the wings of the annular ring, is thrown into the centre of the churn, where, in its descent, it is beaten by arms on the dasher, and, in this way, the churning of the cream is rapidly accomplished.

To enable others skilled in the art to make and use my invention, I will proceed to describe its construction and operation.

Figure 2:
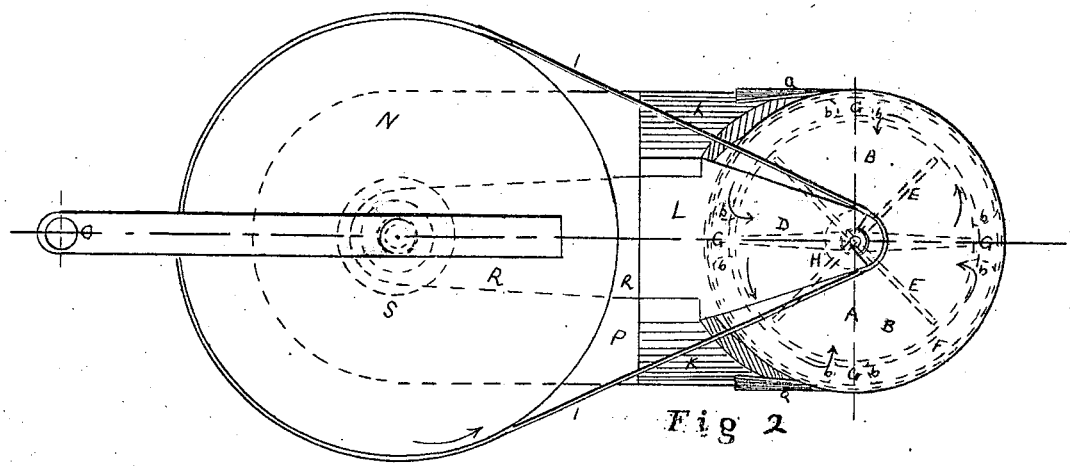
Figure 2 is a plan of the same.
Figure 3:
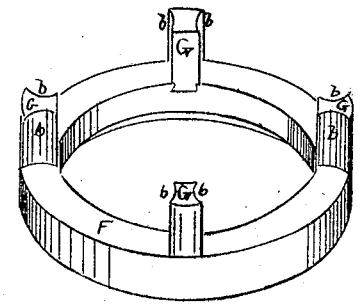
Figure 3 is a perspective view, showing the annular ring in an inverted position.

P is the bottom board, which forms the foundation of the whole apparatus. To this board are attached the uprights K K, which are so shaped as that, in combination with the hoop Q, on the board P, they serve to keep the churn A in position. To these uprights, K K, the arms L and R are attached, the first serving as a bearing for the head of the dasher-shaft C, and the latter, in connection with a step, S, on the board P, serves as a bearing for the shaft M, which carries the main belt-wheel N. On this main belt is secured the crank O, and a belt, I, is arranged around it, and a pulley, H, on the dasher-shaft C, by which the motion is given to the dasher. The churn A is of cylindrical form, and may be made of any suitable material, and has the covers B B, as shown. A step, a, is arranged on the bottom of said churn, as shown, and serves as a bearing for the dasher-shaft C. The annular ring F is made in form, as shown, of any suitable material, and has the arms or wings G G on its lower side. These arms G G have a peculiar cross-section, having concave surfaces b b, on both sides, as seen in fig. 2, the object of these concave surfaces being to guide the cream from the sides to the centre of the churn. On the dasher-shaft C are arranged the broad flat dasher D and the round dasher-arms E E, as shown.

Figure 1:
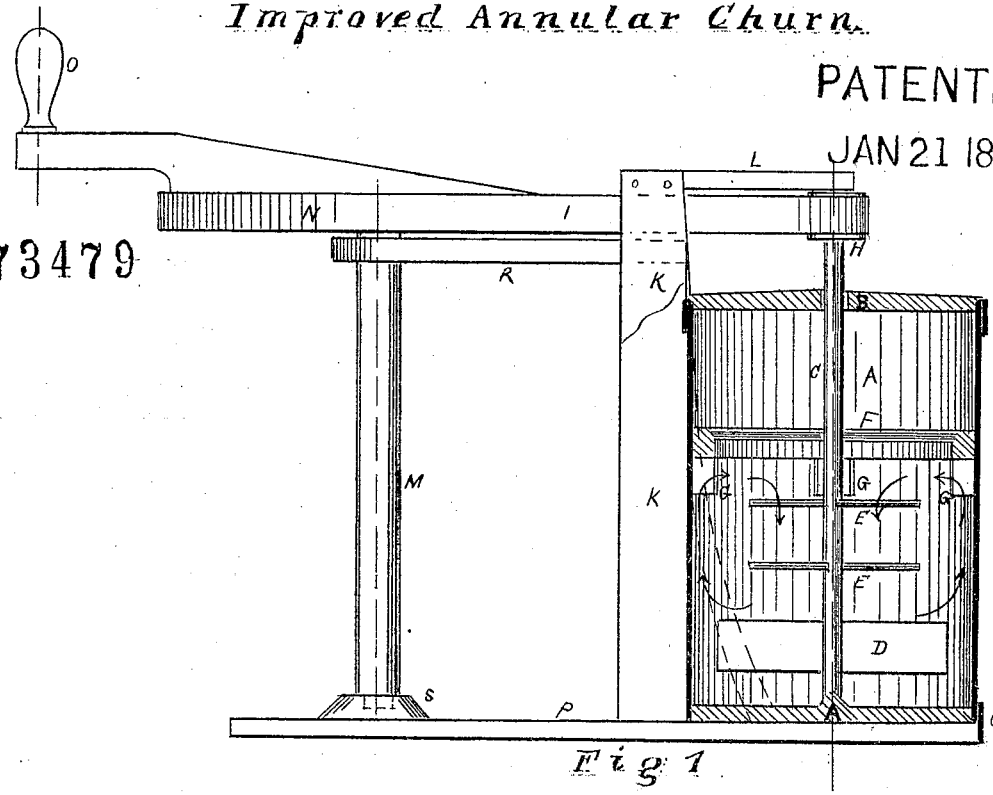
Figure 1 is a side view of my churn, the churn-cylinder being shown in section.

The operation of my churn is as follows: The cream being put into the churn A, the annular ring F is slid up or down until the lower ends of the wings G G are about down to the surface of the cream; the covers B B being then put on, a rapid rotation of the dashers is caused, by means of the crank O. The flat dasher D causes the cream to have a rapid rotary motion, and, by reason of centrifugal force, the cream will move to the sides of the churn, and pass up the sides, where it comes in contact with the wings G G, which throw it into the centre of the churn, where it is dashed or beaten by the dashers E E. The motion of the cream during the process of churning is shown by arrows in fig. 1.

By this means I produce a rapid movement and beating of the cream, by which the process of churning is much facilitated.

Having thus fully described my churn, I wish to be understood that I do not claim as my invention the churn A, the dasher C, pulleys H or N, belt I, nor the uprights K K, nor hoop Q, used separately, nor the covers B B, nor the steps S and a, nor the arms L and R, nor bottom P; but

What I do claim as my invention, and desire to secure by Letters Patent, is—

1. The adjustable annular ring F, when composed of the ring F, made either in one piece or in sections, and the wings G G, with concave surfaces b b, the whole being used in the manner and for the purpose herein specified.

2. The use of the dasher C, constructed as shown, in combination with the annular ring F, in the manner and for the purpose herein specified.

3. The peculiar arrangement and combination of the uprights K K, bottom, P, and hoop Q, for the purpose of holding the churn in position, in the manner herein set forth.

4. The peculiar arrangement and combination of the churn A, annular ring F, dasher C, pulley H, belt I, and driving-pulley N, with crank O thereon, the several parts being arranged as and for the purpose herein specified.

As evidence that I claim the foregoing, I have hereunto set my hand in the presence of two witnesses.

D. T. WARD.

Witnesses:
 W. C. NICHOLS,
 W. H. LAMPRECHT.